(12) United States Patent
    Molozis

(10) Patent No.: US 11,065,913 B2
(45) Date of Patent: Jul. 20, 2021

(54) FORMFITTING SECURING DEVICE FOR A ROLLER

(71) Applicant: TENTE GmbH & Co. KG, Wermelskirchen (DE)

(72) Inventor: Athanasios Molozis, Wuppertal (DE)

(73) Assignee: TENTE GmbH & Co. KG, Wermelskirchen (DE)

( * ) Notice: Subject to any disclaimer, the term of this patent is extended or adjusted under 35 U.S.C. 154(b) by 0 days.

(21) Appl. No.: 16/643,975

(22) PCT Filed: Sep. 11, 2018

(86) PCT No.: PCT/EP2018/074454
§ 371 (c)(1),
(2) Date: Mar. 3, 2020

(87) PCT Pub. No.: WO2019/053004
PCT Pub. Date: Mar. 21, 2019

(65) Prior Publication Data
US 2021/0061003 A1     Mar. 4, 2021

(30) Foreign Application Priority Data
Sep. 13, 2017   (DE) .................... 10 2017 121 146.2

(51) Int. Cl.
*B60B 33/00*     (2006.01)
*B60B 33/02*     (2006.01)

(52) U.S. Cl.
CPC .......... *B60B 33/021* (2013.01); *B60B 33/025* (2013.01); *B60B 33/0021* (2013.01); *B60B 33/0081* (2013.01); *B60B 2200/242* (2013.01)

(58) Field of Classification Search
CPC . Y10T 16/195; Y10T 16/196; B60B 33/0028; B60B 33/0055; B60B 33/0094;
(Continued)

(56) References Cited

U.S. PATENT DOCUMENTS 5,014,391 A  *  5/1991  Schulte ............... B60B 33/0042
                                                    16/35 R
6,584,641 B1 *  7/2003  Milbredt ............. B60B 33/0049
                                                    16/35 R
(Continued)

FOREIGN PATENT DOCUMENTS

DE    20 2017 100 939 U1    4/2017
DE    20 2017 102 277 U1    5/2017
(Continued)

OTHER PUBLICATIONS

International Search Report of PCT/EP2018/074454, dated Dec. 13, 2018.

*Primary Examiner* — Chuck Y Mah
(74) *Attorney, Agent, or Firm* — Collard & Roe, P.C.

(57) ABSTRACT

A formfitting securing device for a roller has a rotation blocking engagement part which is biased into an engagement position by means of a first spring. The first spring exerts a bias onto the rotation-blocking engagement part both in the engaged position as well as in the nonengaged position, and a bias is achieved in the non-engaged position by acting on the rotation-blocking engagement part by means of a second spring.

3 Claims, 9 Drawing Sheets

(58) Field of Classification Search
CPC ............ B60B 33/0039; B60B 33/0049; B60B 33/0057; B60B 33/0068; B60B 33/0081; B60B 33/0084; B60B 33/0092; B60B 33/025; B60B 33/021; B60B 33/0042; B60B 33/0073; B60B 33/0078; B60B 33/0086; B60B 37/10; B60B 2200/222; B60B 2200/242; B60B 2900/531; A61G 7/0528; F16D 49/00; F16D 65/42; F16D 2121/14; F16D 2125/32

See application file for complete search history.

(56) References Cited

U.S. PATENT DOCUMENTS

| | | | | |
|---|---|---|---|---|
| 6,834,746 | B1 * | 12/2004 | Lin | B60B 33/0018 16/35 R |
| 7,406,745 | B2 * | 8/2008 | Chou | B60B 33/0021 16/35 R |
| 7,506,404 | B2 * | 3/2009 | Block | B60B 33/0021 16/18 R |
| 7,922,183 | B2 * | 4/2011 | Figel | A61G 7/0528 280/47.38 |
| 7,987,553 | B2 * | 8/2011 | Lin | B60B 33/0049 16/35 R |
| 8,051,533 | B2 | 11/2011 | Block et al. | |
| 8,850,657 | B1 * | 10/2014 | Yang | B60B 33/021 16/35 R |
| 9,139,041 | B2 * | 9/2015 | Duch | F16C 33/768 |
| 2009/0113671 | A1 | 5/2009 | Chu | |
| 2014/0109342 | A1 * | 4/2014 | Hofrichter | B60B 33/0078 16/47 |
| 2014/0238784 | A1 * | 8/2014 | Yeo | B60B 33/025 188/1.12 |
| 2017/0119607 | A1 * | 5/2017 | Derenne | B60B 33/0092 |

FOREIGN PATENT DOCUMENTS

| | | |
|---|---|---|
| EP | 2 081 778 A1 | 7/2009 |
| EP | 2 081 778 B1 | 11/2010 |
| JP | 2002264604 A * | 9/2002 |
| JP | 2015229460 A * | 12/2015 |
| WO | 2008/055831 A1 | 5/2008 |

* cited by examiner

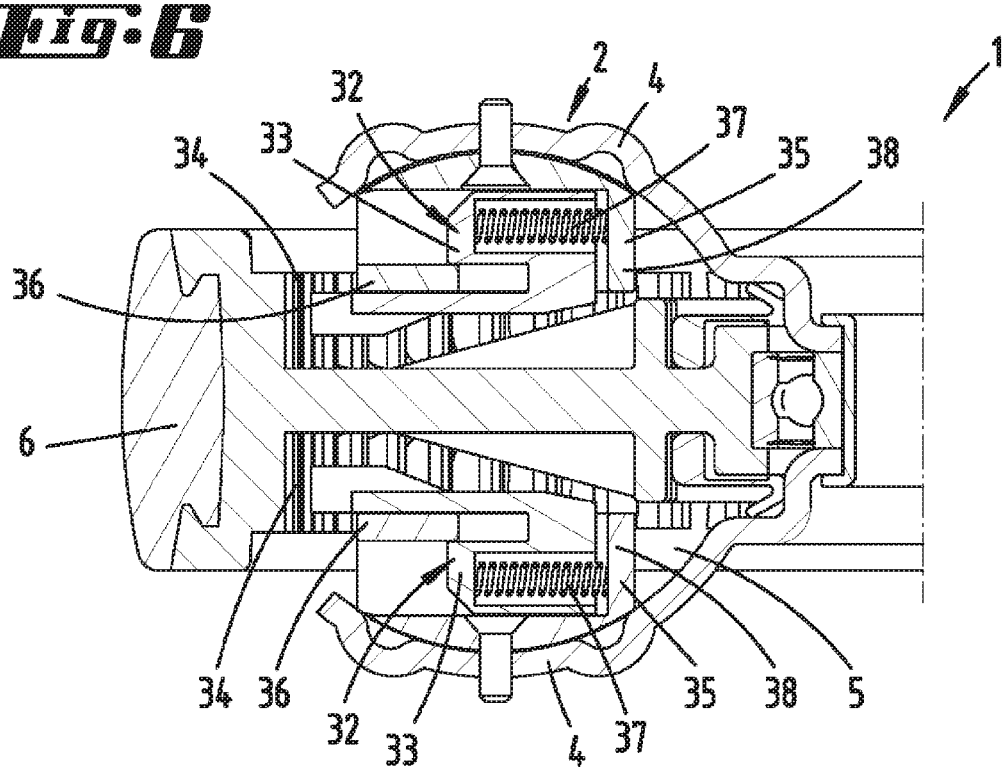
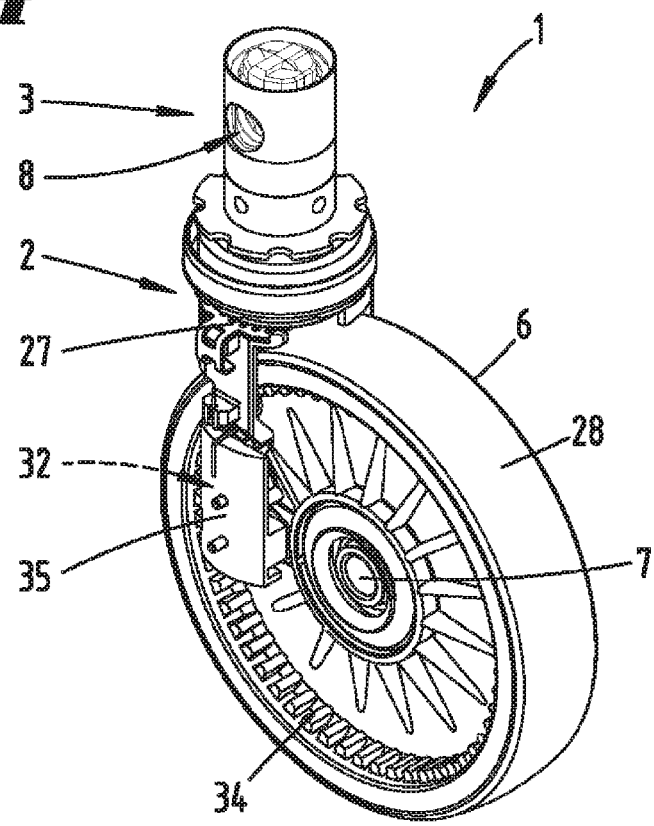

FORMFITTING SECURING DEVICE FOR A ROLLER

CROSS REFERENCE TO RELATED APPLICATIONS

This application is the National Stage of PCT/EP2018/074454 filed on Sep. 11, 2018, which claims priority under 35 U.S.C. § 119 of German Application No. 10 2017 121 146.2 filed on Sep. 13, 2017, the disclosures of which are incorporated by reference. The international application under PCT article 21(2) was not published in English.

TECHNICAL FIELD

The invention relates to a formfitting securing device for a roller, comprising a rotation-blocking engagement part which is biased into an engagement position by means of a first spring.

PRIOR ART

Formfitting securing devices of the type in question are known, in particular for rollers having a running wheel and a fork, additionally optionally a mounting pin. The running wheel of the roller may be rotationally blocked with respect to the geometric running wheel axis via the formfitting securing device. For this purpose, the rotation-blocking engagement part, which is arranged in the known solutions, for example, on the fork or mounting pin side, is in an engagement position with at least one running wheel-side mating engagement part in a formfitting position. In this context, it is further known to provide a circumferential toothing with respect to the running wheel axis on the running wheel side, into which toothing the rotation-blocking engagement part may engage for activating the formfitting securing device.

In is also known to load such a rotation-blocking engagement part in the engagement position by means of a spring biased in the direction of the engagement position.

Reference is made in this context, for example, to EP 2 081 778 B1. From this a roller, in this case a caster, is depicted and described which, in addition to the rotational mobility of the running wheel, also has a pivoting mobility of the roller about an essentially vertical pivot axis in the use state, for which roller the rotation-blocking engagement part is aligned and displaceable essentially parallel to a mounting pin axis of the roller for interacting with a crown gear of the running wheel, thus additionally essentially oriented to a vertically aligned line corresponding to conventional use. The rotation-blocking engagement part is arranged facing vertically upward in the use state. The spring acting on the engagement part acts on the rotation-blocking engagement part in the engagement position or in a prepared engagement position.

A formfitting securing device is known from DE 202017102277 U1, in which the effect of a second spring on the rotation-blocking engagement part may only be released by a linear displacement of a tappet. The movement direction of the rotation-blocking engagement part runs parallel to the movement direction of the tappet.

A formfitting securing device is known from US 2009/0113671 A1, in which a biasing of the rotation-blocking engagement part into the non-engagement position is achieved by a direct action of a lever extension on the part.

It is known from EP 3103653 A1 to provide a rotation-blocking engagement part in combination with a friction locking part. The rotation-blocking engagement moves in parallel to a movement direction of the tappet. A carriage, on which an engagement part is located, moves as a result of the pressure effect of the lever part and due to gravity.

BRIEF DESCRIPTION OF THE INVENTION

Arising from the outlined prior art, the invention concerns the problem of advantageously designing a formfitting securing device.

This problem is solved by the subject matter of claim 1, wherein the angle is a right angle or an acute angle, that a release of the force of the second spring on the rotation-blocking engagement part is carried out as a result of a rotational displacement of the lever part counter to the acting force of the second spring, the rotation-blocking engagement part is displaced after such a release in the direction of the engagement position, solely as a result of the first spring acting directly on the same, that the rotation-blocking engagement part is provided in combination with a friction locking device, and that the lever part, the rotation-blocking engagement part, and the first and second springs are arranged in a mutual holding part.

The rotation-blocking engagement part is correspondingly also directly or indirectly loaded in the non-engagement position in such a way that, in the non-engagement position, the rotation-blocking engagement part is biased into the engagement position by a spring acting in the direction of the engagement position. The rotation-blocking engagement part is always subjected to a dischargeable force reserve in every position of the engagement part.

From this, as is also preferred, a displacement of rotation-blocking engagement part into the engagement position may be carried out solely as a result of a discontinuance of the second spring acting on the rotation-blocking engagement part or solely through a reduction of the relevant spring force. The force of the first spring acting directly on the rotation-blocking engagement part is, in the case of a discontinuance or a corresponding reduction of the spring force of the section spring, effective by itself, or in any case greater than, an—optionally—still acting yet reduced force of the second spring. The rotation-blocking engagement part may thus be displaced directly into the engagement position solely as a result of the action of the first spring.

To displace the rotation-blocking engagement part back into the non-engagement position, the second spring acts on the rotation-blocking engagement part counter to the force of the first spring, or the spring force of the second spring is increased above a spring force value of the first spring. The force of the second spring exceeds that of the first spring here, by which means the movement direction of the rotation-blocking engagement part is predetermined by the dominating second spring in this state. The force of the second spring is thereby selected so that any friction forces, which may also counteract a displacement of the engagement part, may also be overcome.

The effect of the second spring on the rotation-blocking engagement part may be released by a lever part interacting with the second spring. The effect of the second spring on the rotation-blocking engagement part may be provided indirectly, with the interposition of the lever part, according this embodiment. The effect on the rotation-blocking engagement part may be released or provided via the lever part according to a preferred pivoting or sliding displacement of the lever part, depending on the position of the lever part.

The second spring may, as is also preferred, effectively load the lever part both in the engagement position and also in the non-engagement position of the rotation-blocking engagement part, correspondingly, this is preferably biased in both positions. The lever part is preferably always biased in the direction of the non-engagement position of the engagement part.

As a result of a displacement, in particular a rotational displacement, of the lever part counter to the acting force of the second spring, the effect of the force of the second spring on the rotation-blocking engagement part is preferably released, said rotation-blocking engagement part is displaced, after such a release, in the direction of the engagement position, preferably solely as a result of the first spring acting directly on the same.

The lever part is preferably deliberately moved by an active displacement into the release position. The backward displacement into the position holding the rotation-blocking engagement part in the non-engagement position may preferably be effected solely in that a force, acting on the lever part in the position releasing the engagement part, is suspended. It is not mandatory, even though also possible, to bring the lever part actively into the position displacing the rotation-blocking engagement part into the non-engagement position, for example, through a deliberate return rotational displacement.

A linearly displaceable tappet may act on the lever part. Such a linearly displaceable tappet may, for example, be arranged inside of a mounting pin of the roller, by means of which mounting pin the roller is fixable, for example, to a frame. Thus, a device may additionally be provided, which acts displacingly on the tappet. In one possible embodiment, such a tappet is slidably displaceable along a mounting pin axis, which is preferably aligned vertically to the roller in the conventional use position.

The effect of the tappet on the lever part may be provided directly, or also only indirectly, due to the interposition of another, force-transmitting component.

In the case of a pivot roller, such a tappet may also be triggered simultaneously to or also as an alternative to a pivotal blocking of the roller, depending on the displacement path of the tappet.

With respect to a plane of projection, in which the geometric axis of rotation of the running wheel of the roller is depicted as a point, a movement direction of the rotation-blocking engagement part defines an angle with a movement direction of the tappet. The angle is a right angle or an acute angle. Furthermore, the angle may be, in particular, an angle of more than 0°, so, for example, 0.5 or 1° up to 80°, 85°, or also 89.5°, up to 90°.

In another possible embodiment, a line, aligned in the movement direction and extending centrally through the rotation-blocking engagement part, with respect to a projection in the previously described plane, may run perpendicular to the movement direction of the tappet, thus defining an essentially right angle, wherein this line may additionally transverse the geometric axis of rotation of the running wheel.

In another possible embodiment, the rotation-blocking engagement part faces in the running direction of the running wheel with its ends acting as the formfitting securing device.

In the case of a rotation-blocking engagement part provided in combination with a friction locking device, the friction locking device may have, as preferred, a brake pad which, optionally arranged on the linearly displaceable tappet, acts in the locked position in a friction locking way on the running surface of the running wheel.

In addition, the lever part and/or the rotation-blocking engagement part and/or the first and/or the second spring may be arranged in a mutual holding part. Such a holding part may, in turn, be supported on the fork of the roller holding the running wheel.

The two provided springs may be selected to be the same with respect to their configuration. Only the spring force of the second spring is higher, for example, by a factor of 1.5 to 4, additionally by way of example, approximately two times the value with respect to the value of the spring force of the first spring.

In addition, the first spring may be a cylindrical compression spring, while the second spring may be a leg spring.

The previously and subsequently mentioned areas with respect to value ranges or multiple ranges also include all intermediate values with respect to the disclosure, in particular in 1/10 increments of the respective dimension, optionally also without dimensions. For example, the indication of 1 to 90° also includes the disclosure of 1.1 to 90°, 1 to 89.9°, 1.1 to 89.9°, etc. This disclosure may, on the one hand, function for limiting a listed range limit from below and/or above; however, it may function alternatively or supplementally to disclose one or multiple singular values from a respectively indicated range.

BRIEF DESCRIPTION OF THE FIGURES

The invention is subsequently described in greater detail by way of the appended figures, which, however, depict only one exemplary embodiment.

FIG. 6 shows the section according to line VI-VI in FIG. 3 in an enlarged depiction;

FIG. 7 shows a depiction according to FIG. 1; however with a fork leg removed;

DETAILED DESCRIPTION OF THE INVENTION

Figure 1:
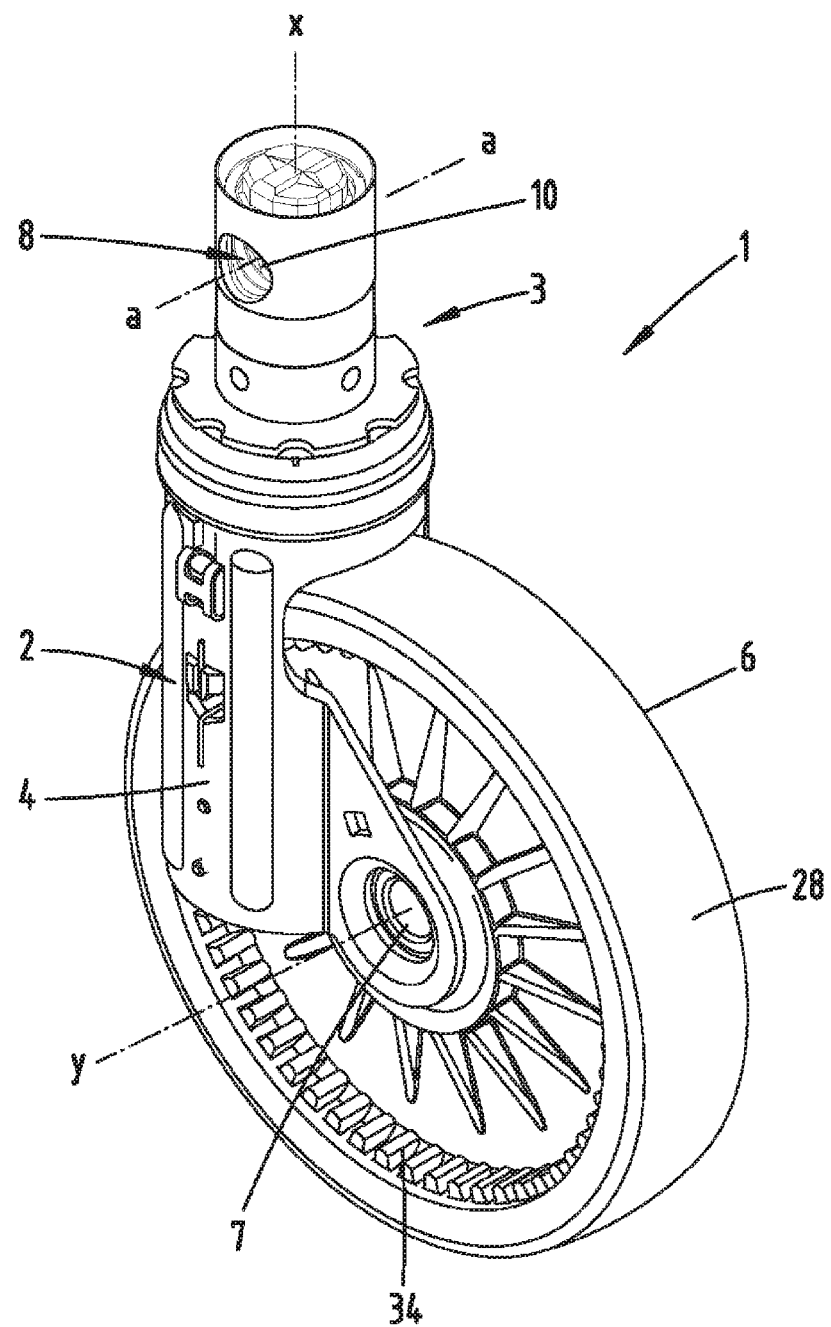
FIG. 1 shows a roller in a perspective depiction.
Figure 2:
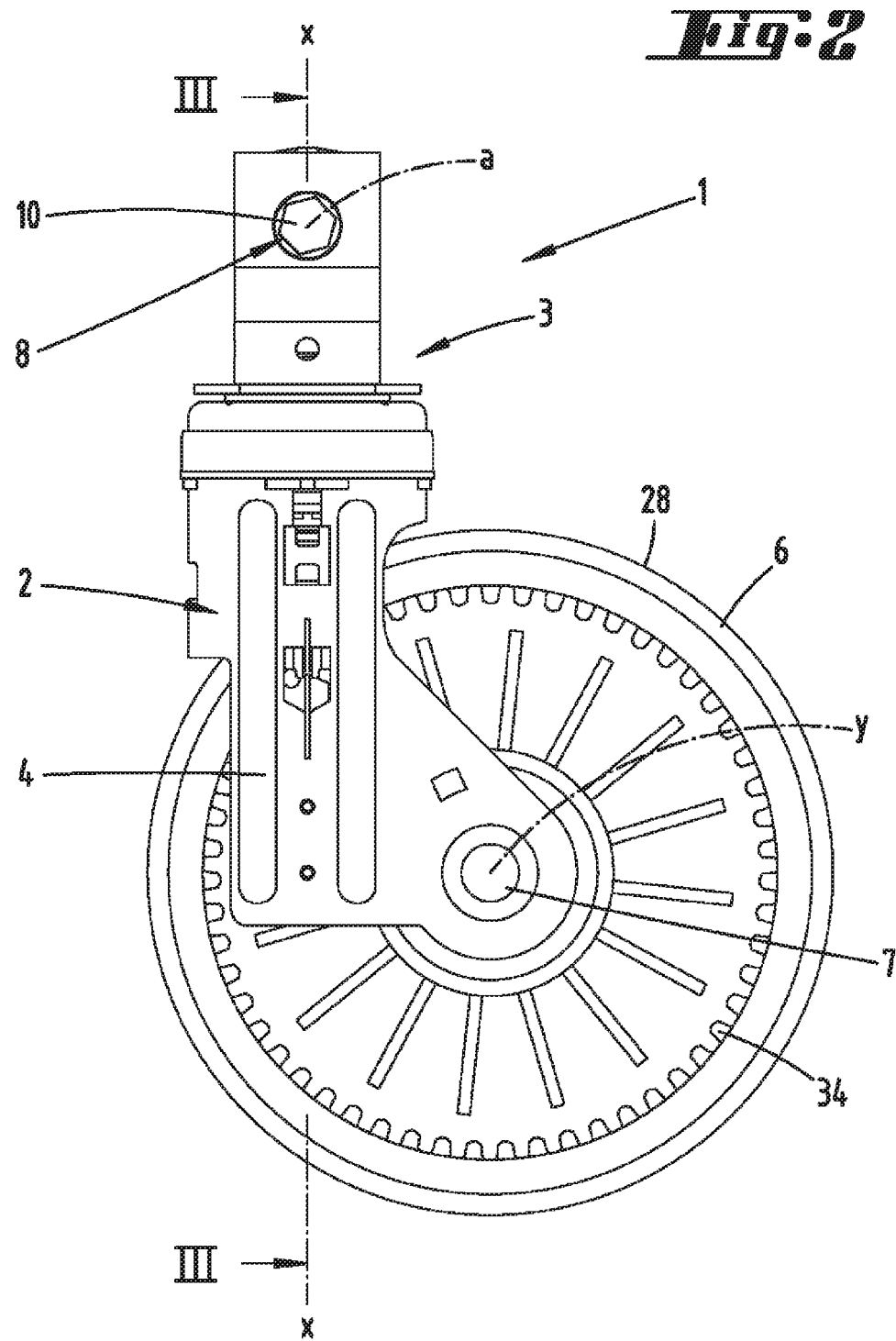
FIG. 2 shows the roller in a side view.

A roller 1, here preferably a type of a castor, is depicted and described, initially with reference to FIG. 1. The roller, optionally the steering roller, may have a steering roller fork 2, from which a cylindrically configured mounting pin 3 may emerge. Mounting pin 3 may protrude vertically upward with respect to the running wheel and surrounding a pivot axis x. Steering roller fork 2, with its fork legs 4 arranged preferably congruently opposite, may comprise a running wheel 6 mounted in an optionally provided fork cavity 5. In the depicted embodiment, a hollow shaft 7 may function to mount running wheel 6, said hollow shaft may be supported at each respective end side of fork legs 4 and centrally penetrating running wheel 6. The geometric axis of rotation y of running wheel 6 preferably extends substantially transversely to pivot axis x.

Roller 1 as depicted may, for example, be positioned on a hospital bed or the like. The fixing may be carried out using mounting pin 3 in the usual way, and is therefore not described here in greater detail.

A control cam 8 may additionally be provided in mounting pin 3 and arranged to be pivotable about an actuating axis a. Actuating axis a may hereby extend aligned at right angles to pivot axis x of roller 1. The fixing of control cam 8 within mounting pin 3 may be provided in a known way, in that a mounting sleeve 9 is provided aligned about a pivot axis x. Control cam 8 may have a non-circular coupling opening 10 arranged centrally for rotary entrainment of control cam 8, said coupling opening may be penetrated for actuation by a switch lever rod, not depicted.

Figure 3:
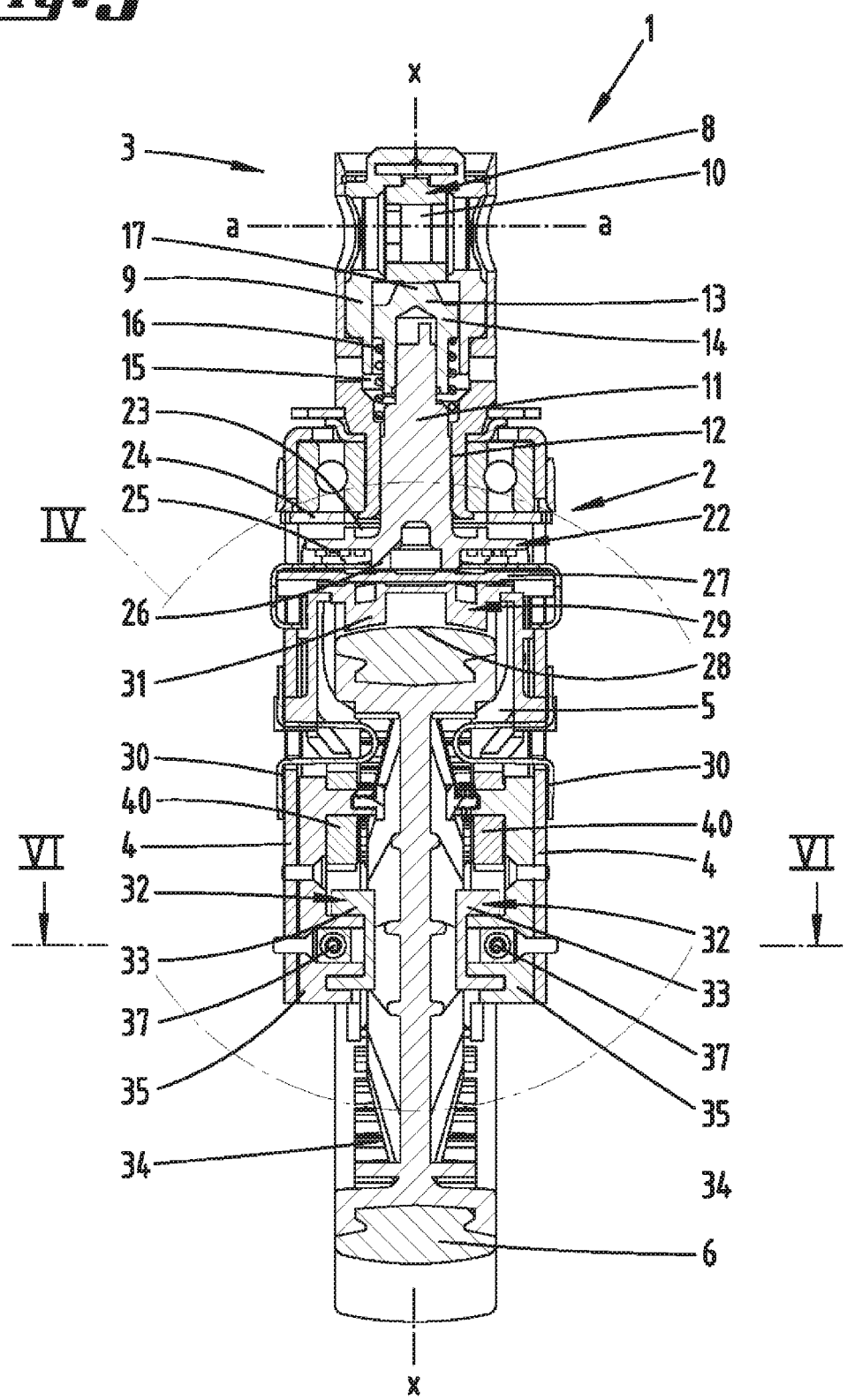
FIG. 3 shows the section according to line III-III in FIG. 2.
Figure 4:
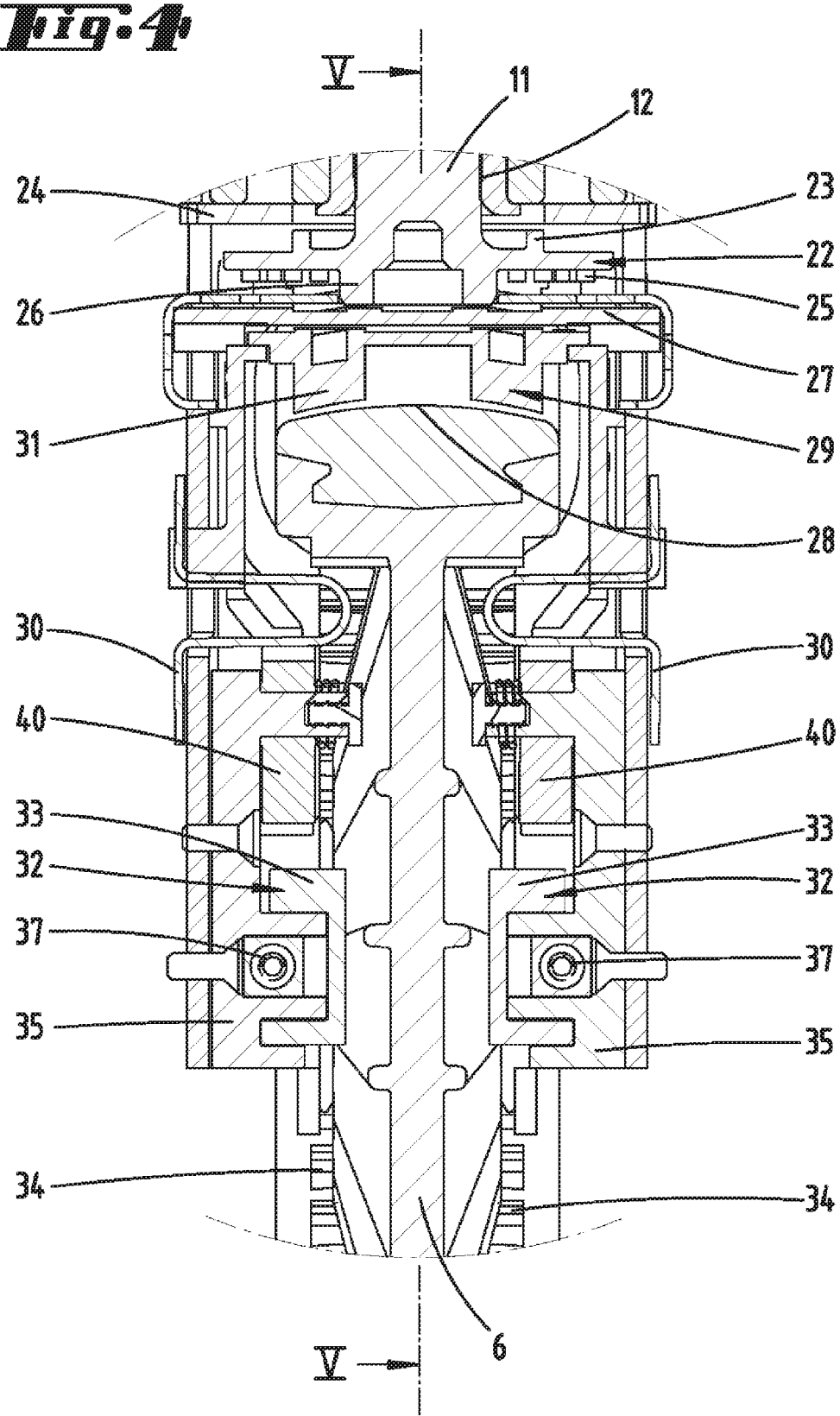
FIG. 4 shows the enlargement of area IV in FIG. 3.
Figure 5:
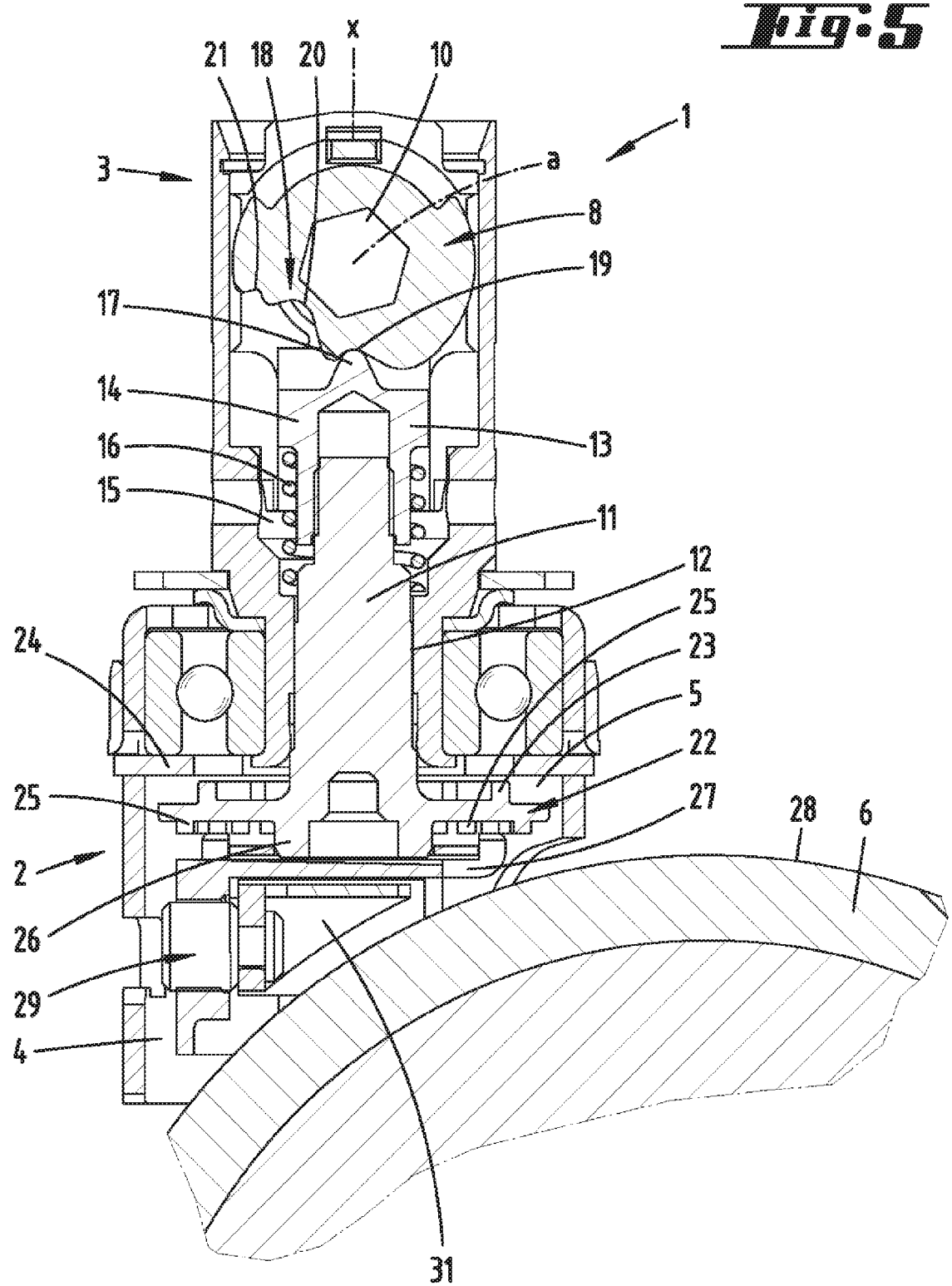
FIG. 5 shows the section according to line V-V in FIG. 4.

Based on the depictions, for example in FIGS. 3 and 5, a tappet 11 is provided underneath control cam 8. Said tappet is preferably displaceable in mounting pin 3 aligned vertically about pivot axis x. Mounting pin 3 may also preferably have a passage 12, reduced in diameter and aligned about pivot axis x, which may be adjusted in cross section to tappet 11. Tappet 11 may be prevented from rotating within mounting pin 3.

As particularly shown in the depiction in FIG. 5, the free end of tappet 11, arranged between the opening of passage 12 and control cam 8, may be screw connected to a cam part 13. Cam part 13 may hereby preferably have a pot-like configuration with a more preferably circular cross section, wherein an area of increased diameter may be designed as ring collar 14 on the end facing away from tappet 11. In addition, cam part 13 of tappet 11 is preferably vertically guided inside of mounting pin 3 based on the depictions. For this purpose, mounting pin 3 may have a cavity 15 adjusted to the diameter of optionally provided ring collar 14 and surrounding pivot axis x. In addition, the section of cam part 13 of reduced diameter opposite ring collar 14 may be surrounded by a compression spring 16, wherein the one end of compression spring 16 may be supported on the underside of ring collar 14. The other, opposite spring end may be supported on an edge of passage 12. It may thus be provided that tappet 11 is spring force loaded in the direction of control cam 8 by means of compression spring 16. In addition, the front face of optionally provided ring collar 14, facing control cam 8, may also have a central projection in the form of a counter-cam 17.

Optionally provided counter-cam 17 may interact with the facing control surface 18 of cam part 3, said control surface 18 may be composed essentially from, for example, three differently deep areas, with respect to the radial distance to actuating axis a, arranged in sequence in the circumferential direction of control cam 8 and optionally in the form of control troughs 19, 20, and 21.

Tappet 11 preferably extends in the direction of fork cavity 5 or up to the same, when viewed in the direction of running wheel 6. Fork cavity 5 preferably surrounds a projection of tappet 11 that is round in cross section. This projection may be larger in diameter than an upper area of tappet 11. The projection may assume the function of a latching plate 22, which may then be shaped on tappet 11 surrounding pivot axis x and transverse to the same.

Latching plate 22 may have latching projections on its plate surface facing control cam 8, in particular latching projections 23 designed like ribs. Latching projections 23 may be pressed flat against the underside of a direction locking part 24 in a steering roller position caused by the spring force of compression spring 16. The direction locking part may be fixed on fork 2. The steering roller position may be engaged by rotating mounting pin 3 in an interactive position of counter-cam 17 of tappet 11 and control trough 20, or another comparable projection. The steering roller setting may, with reference to the figures, facilitate a lifting of cam part 13 and of tappet 11, optionally with its latching plate 22, as a result of the application of spring force, in contrast to the neutral position depicted in FIG. 5.

Tappet 11 may have rotation blocking protrusions 25 of the underside of latching plate 22 facing away from latching projections 23. Said rotation blocking projections may respectively extend coaxial to pivot axis x in the circumferential direction of latching plate 22 and may have an approximately cylindrical configuration.

From latching plate 22, a circular cylindrical extension 26 with a reduced diameter with respect to latching plate 22, may emerge from tappet 11, when viewed in the direction of running wheel 6, and may be inserted in a guiding way in a centrally arranged through opening of a rotation blocking part 27 arranged about pivot axis x. Rotation blocking part 27, inserted in fork cavity 5 between running wheel 6 and latching part 22, may likewise be supported rotationally fixedly, like direction locking part 24, and may be designed, for example, as a stamped and bent part.

Rotation blocking part 27 may have blocking sockets adapted to the geometry of rotation blocking protrusions 25.

As a result of the interaction of rotation blocking protrusions 25 of latching plate 22 and the blocking sockets in rotation blocking part 27, roller 1 may be fixable in different pivot positions about pivot axis x. For this purpose, control cam 1 may pivot into a position about its actuating axis a, in which control trough 21 may enter into the operating position with respect to counter-cam 17. Counter cam 17 may, together with tappet 11, be moved downward, with reference to the depictions, counter to the force of compression spring 16. Rotation blocking protrusions 25 may engage in the assigned blocking sockets in a way that prevents pivoting.

At the same time, a rotational locking of running wheel 6 may be achieved in this position. For this purpose, extension 26 of tappet 11 may initially act on a friction locking device 29, arranged in fork cavity 5 above running wheel 6. This friction locking device 29 may be mounted and guided on fork legs 4, wherein friction locking device 29 may be spring biased by the lowering or tappet 11 as a result of the arrangement of hairpin spring 30. The actual locking element for running wheel 6 may be a brake pad 31, arranged in locking device 29, and which may have a rotation blocking effect in the case of a downward displacement onto running surface 28 of running wheel 6.

Reference is made to EP 1 778 504 B1 with regard to the essential configuration, and additionally with respect to the function, of roller 1, in particular with respect to the configuration and arrangement of tappet 11 with its cam part 13, and latching plate 22, direction locking part 24, rotation blocking part 27, and friction locking device 29. This content of this patent document is hereby completely incorporated into the disclosure of the present invention, also with the purpose of incorporating features of this patent document into the claims of the present invention.

In addition to previously described friction locking device 29, roller 1 may be provided with a formfitting securing device 32. This may have a rotation-blocking engagement part 33, for preferred interaction with a circumferential toothing 34 provided on the inner side of the running wheel.

Rotation-blocking engagement part 33 may be slidably mounted in a holding part 35 fixed in a side of a fork leg. The alignment may hereby be selected so that engagement part 33 may be movable, according to a side view according to FIG. 8, along a line b, which is aligned perpendicular to pivot axis x and transverses axis of rotation y of running wheel 6. Correspondingly, it may be a radial alignment of movement direction c of engagement part 33 with respect to axis of rotation y of running wheel 6.

Figure 8:
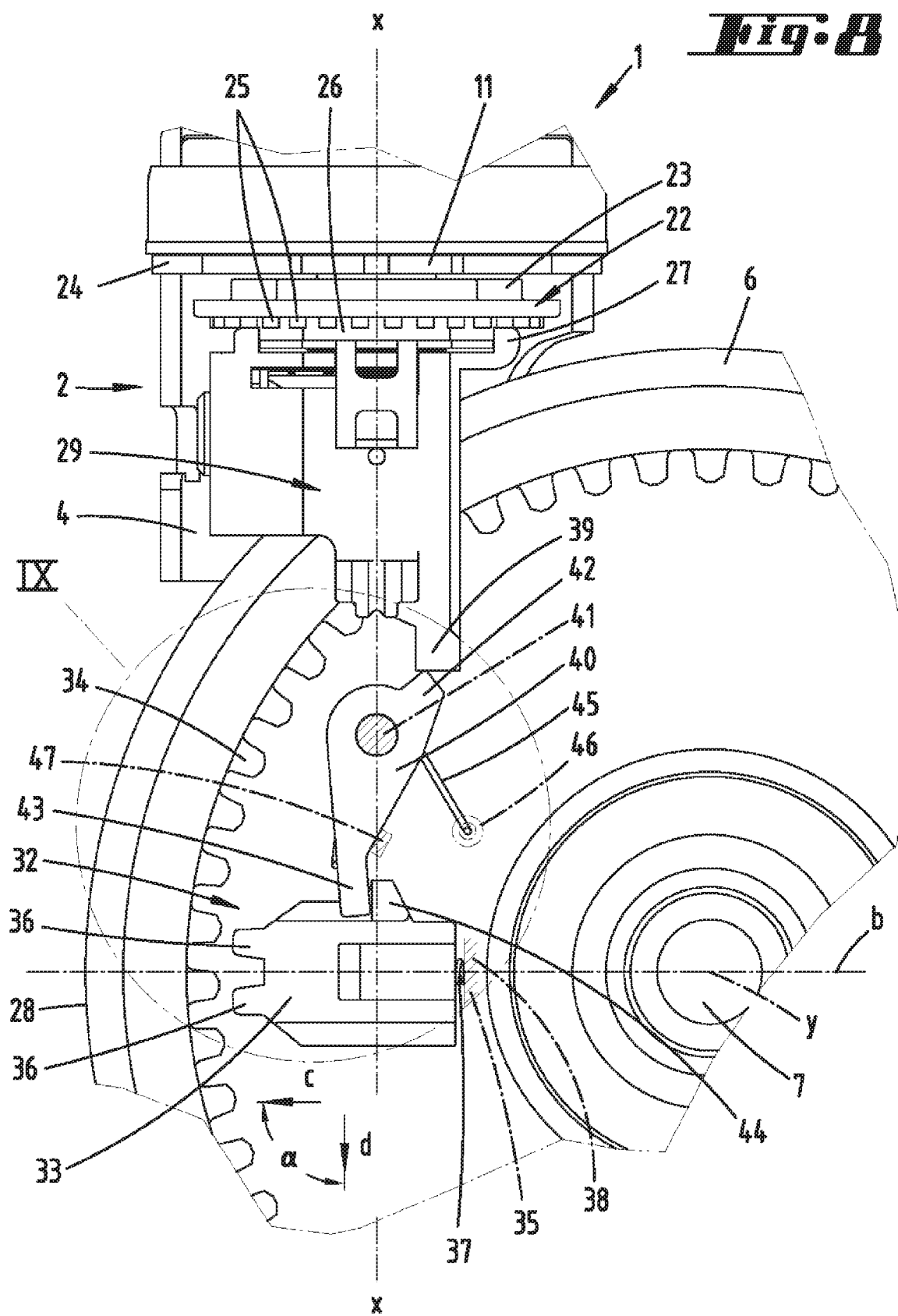
FIG. 8 shows an enlarged side view depiction around the roller with the fork leg and a holding part removed.

In another preferred embodiment, engagement part 33 may be arranged with respect to toothing 34, both in an engagement position and also in a non-engagement position, so that said engagement part may be crossed by geometric pivot axis x, with respect to a projection into a plane, in which axis of rotation y is depicted as a point, corresponding approximately to the depiction in FIG. 8.

Movement direction d of tappet 11 may define a right angle α to movement direction c of rotation-blocking engagement part 33 in the depicted embodiment.

Rotation-blocking engagement part 33 may project, facing toothing 34, two locking teeth 36, spaced apart from one another and adapted in their spacing and configuration to toothing 34.

Rotation-blocking engagement part 33 may be spring-loaded in the direction of the engagement position. For this purpose, a first spring 37, preferably in the form of a cylindrical compression spring, is provided, which may be supported on the one end on engagement part 33 and on the other end preferably on a facing section 38 of holding part 35, preferably in holding part 35.

Friction locking engagement part 29 may be provided with an extension 39 projecting downward, with respect to the depictions, which extension may be guided laterally past running wheel 6 in the area of respective fork leg 4.

In the totally fixed position of roller 1, in which a rotational fixing of running wheel 6 may also be achieved, a lever part 40, likewise pivotably arranged in holding part 35, may be activated via extension 39. This lever part 40 may be pivotably displaceable in holding part 35 about a pin 41 provided on the side of holding part. The respective pivot axis may extend in parallel alignment to axis of rotation y of running wheel 6, hereby optionally transversing pivot axis x with respect to the previously mentioned projections.

Lever part 40 may be provided with an extension arm 42 on the side facing the securing device side of extension 39. Said extension arm may always be in contact with extension 39 in one preferred embodiment.

A control arm 43 may additionally be formed on lever part 40 opposite extension arm 42 with respect to pin 41. Said control arm 43 may project, based on the depictions, essentially downward in the direction of rotation-blocking engagement part 33, for which purpose a correspondingly positioned shoulder 44 may be formed on engagement part 33.

A second spring 45, preferably a leg spring, whose spring force may be selected to be greater than that of first spring 37, may be assigned to lever part 40.

Second spring 45 may be supported with one spring leg in a recess 46 of holding part 35, while the other spring leg may be supported on a flank of lever part 40 while spring biasing lever part 40 counter clockwise, with reference to the depictions.

Figure 9:
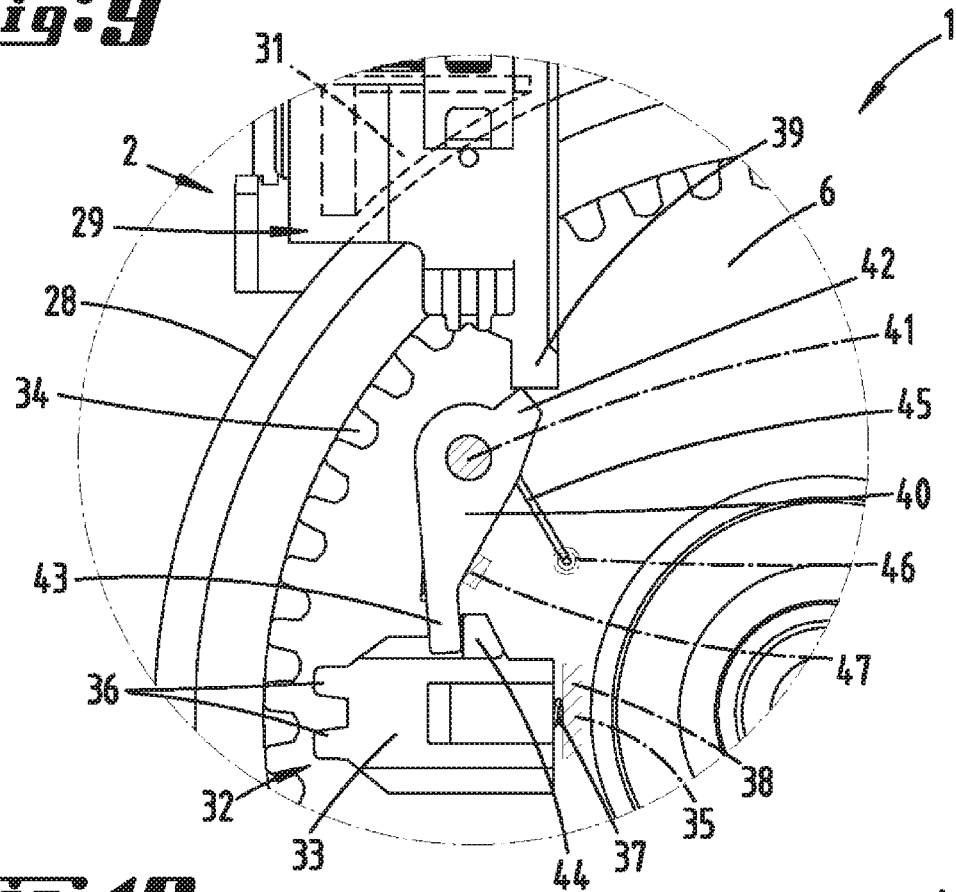
FIG. 9 shows the enlargement of area IX in FIG. 8, relating to a non-engagement position of a rotation-blocking engagement part.

Furthermore, second spring 45 may act on lever part 40 in such a way that a loading of rotation-blocking engagement part 33 in the direction of the non-engagement position according to FIGS. 8 and 9 may be achieved via the interaction of control arm 43 and shoulder 44.

In the initial position, according to the depictions in FIGS. 8 and 9, which may also be limited by stops, for example, by a holding part pin 47, against which lever part 40 may stop, which initial position may correspond either to the neutral position of roller 1 according to the control cam position in FIG. 5, or also to the fixed caster position, rotation-blocking engagement part 33 may be held in the non-engagement position, counter to the force of first spring 37 acting on engagement part 33, by lever part 40 as a result of the greater force of second spring 45.

Figure 10:
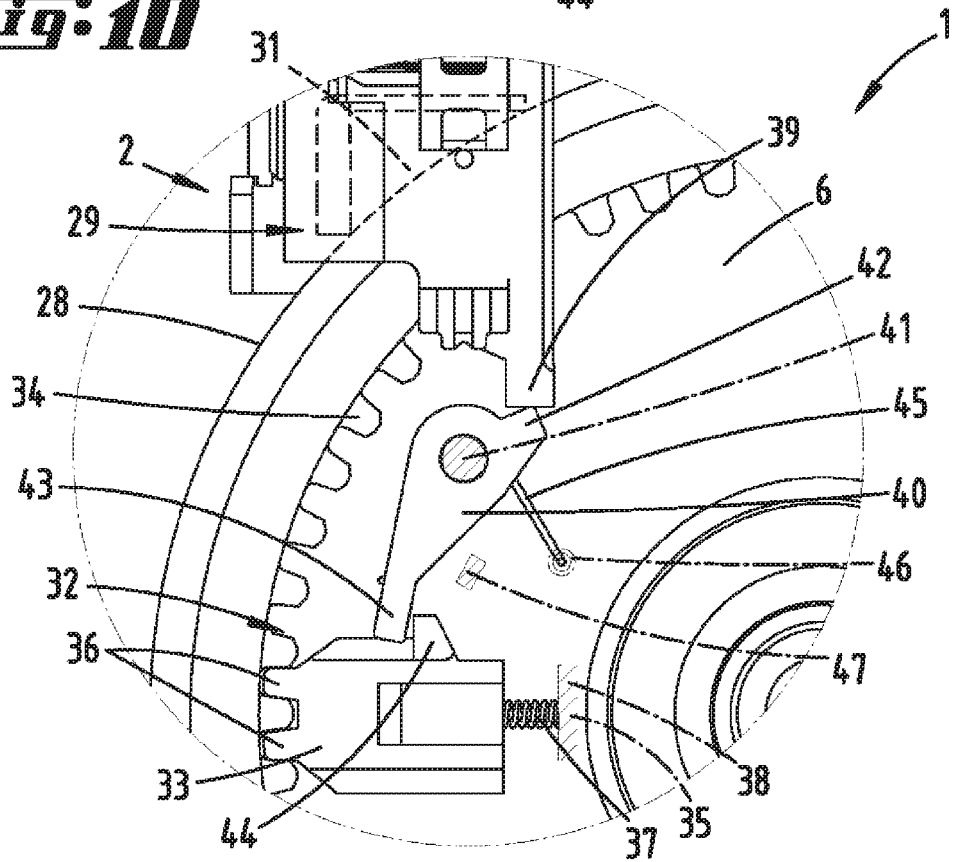
FIG. 10 shows a depiction according to FIG. 9; however, relating to the engagement position.
Figure 11:
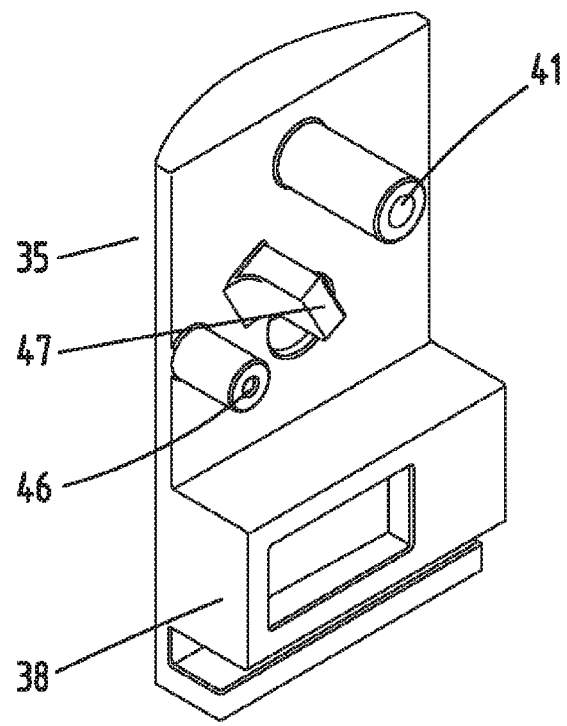
FIG. 11 shows the holding part in an individual, perspective depiction.
Figure 12:
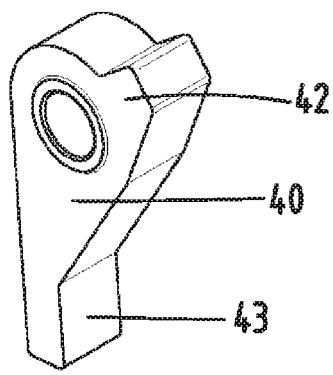
FIG. 12 shows a lever part in an individual, perspective depiction.
Figure 13:
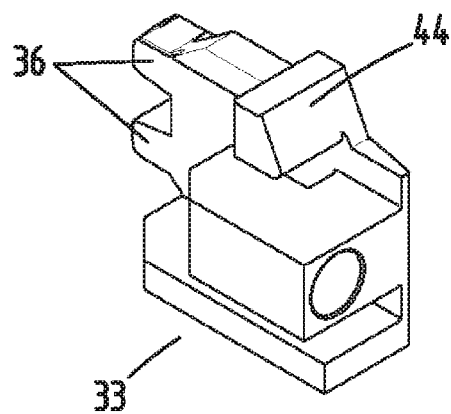
FIG. 13 shows the engagement part in an individual, perspective depiction.

The displacement of tappet 11 downward in the direction of the total locking position may initially effect, in addition to the pivot locking position and the activation of friction locking device 29 via the interaction of extension 39 and extension arm 42 of lever part 40, a pivotal displacement of lever part 40 counter to the force of second spring 45 which biases the same (counter clockwise according to the depictions), at a corresponding rotation of control cam 8. Correspondingly pivoting control arm 43 may allow a displacement of rotation-blocking engagement part 33 into its movement direction c as a result of the spring force of first spring 37 acting on this part (compare FIG. 10).

Locking teeth 36 may optionally engage directly into the gaps between the teeth of toothing 34, so that a formfitting securing may act in addition to the friction locking.

Depending on the position of running wheel 6 in the circumferential direction, locking teeth 36 of rotation-blocking engagement part 33 may optionally impact on the teeth of toothing 34 when the total locking is triggered. Due to the force reserves provided of first spring 37, which is preferably still biased in the engagement position, an automatic engagement of engagement part 33 into the locked position may still be provided by a subsequent rotational displacement of running wheel 6 by one or two degrees.

In the course of the release of the total locking, tappet 11 may be released. Correspondingly, latching plate 22 may be released from the pivot locking position and the impingement of formfitting securing device 32 via extension of tappet 11 may be suspended. Rotation-blocking engagement part 29 may be released from the friction locking position via hairpin spring 30. At the same time, lever 40 of formfitting securing device 32 may shed the controlling load via extension 39. Lever part 40 may consequently, as a result of the force effect of second spring 45, pivot back, preferably dragging rotation-blocking engagement part 33 along via shoulder 44, into the optionally stop-limited initial position, into which initial position, which may correspond to the non-engaged position, engagement part 33 may be biased by first spring 37 acting thereon.

All disclosed features are essential to the invention (in themselves and also in combination with one another). In the disclosure of the application, the disclosure of the associated/appended priority documents (copy of the previous application) are completely incorporated, also with the purpose of including features of these documents in the claims of the present application. The subclaims characterize with their features, even without the features of a referenced claim, refinements of the prior art independently according to the invention, in particular in order to carry out divisional applications on the basis of these claims. The invention indicated in each claim may additionally have one or more of the features in the preceding description, in particular provided with reference numerals and/or listed in the list of reference numerals. The invention also relates to embodiments, in which individually listed features of the preceding description are not implemented, in particular if they are recognizably superfluous for the respective application purpose, or may be replaced by other technical, identically acting means.

LIST OF REFERENCE NUMERALS

| | |
|---|---|
| 1 | Roller |
| 2 | Roller fork |
| 3 | Mounting pin |
| 4 | Fork leg |
| 5 | Fork cavity |
| 6 | Running wheel |
| 7 | Hollow shaft |
| 8 | Control cam |
| 9 | Mounting sleeve |
| 10 | Coupling opening |
| 11 | Tappet |
| 12 | Passage |
| 13 | Cam part |
| 14 | Ring collar |
| 15 | Cavity |
| 16 | Compression spring |
| 17 | Counter-cam |
| 18 | Control surface |
| 19 | Control trough |
| 20 | Control trough |
| 21 | Control trough |
| 22 | Latching plate |
| 23 | Latching projection |
| 24 | Direction locking part |
| 25 | Rotation blocking protrusion |
| 26 | Extension |
| 27 | Rotation blocking part |
| 28 | Running surface |
| 29 | Friction locking device |
| 30 | Hairpin spring |
| 31 | Brake pad |
| 32 | Formfitting securing device |
| 33 | Rotation-blocking engagement part |
| 34 | Toothing |
| 35 | Holding part |
| 36 | Locking tooth |
| 37 | First spring |
| 38 | Section |
| 39 | Extension |
| 40 | Lever part |
| 41 | Pin |
| 42 | Extension arm |
| 43 | Control arm |
| 44 | Shoulder |
| 45 | Second spring |
| 46 | Recess |
| 47 | Pin |
| α | Angle |
| a | Actuating axis |

-continued

LIST OF REFERENCE NUMERALS

| | |
|---|---|
| b | Line |
| c | Movement direction |
| d | Movement direction |
| x | Pivot axis |
| y | Axis of rotation |

The invention claimed is:

1. A formfitting securing device for a roller that has a running wheel and a fork, the formfitting securing device being configured to block the running wheel of the roller with respect to a geometric running wheel axis, the formfitting securing device comprising:
a rotation-blocking engagement part,
a first spring that biases the rotation-blocking engagement part into an engagement position, wherein the first spring exerts a bias on the rotation-blocking engagement part, both in an engaged position and also in a non-engaged position,
a second spring that acts on the rotation blocking engagement part to achieve a bias in the non-engaged position,
a lever part that is configured to interact with the second spring to release a force of the second spring on the rotation-blocking engagement part, wherein said lever part can be acted upon by a linearly displaceable tappet, and a movement direction of the rotation-blocking engagement part defines an angle (α) with a movement direction of the tappet,
wherein the angle (α) is a right angle or an acute angle,
wherein the release of the force of the second spring on the rotation-blocking engagement part is carried out as a result of a rotational displacement of the lever part counter to an acting force of the second spring,
wherein the rotation-blocking engagement part is displaced after said release in a direction of the engagement position, solely as a result of the first spring acting directly on the rotation blocking engagement part,
wherein the rotation-blocking engagement part is provided in combination with a friction locking device, and
wherein the lever part, the rotation-blocking engagement part and the first and second springs are arranged in a mutual holding part.

2. The formfitting securing device according to claim 1, wherein the first spring is a cylindrical compression spring.

3. The formfitting securing device according to claim 1, wherein the second spring is a leg spring.

* * * * *